US008817441B2

(12) United States Patent
Callanan

(10) Patent No.: US 8,817,441 B2
(45) Date of Patent: Aug. 26, 2014

(54) CIRCUIT BREAKER

(75) Inventor: Robert J. Callanan, Raleigh, NC (US)

(73) Assignee: Cree, Inc., Durham, NC (US)

( * ) Notice: Subject to any disclaimer, the term of this patent is extended or adjusted under 35 U.S.C. 154(b) by 752 days.

(21) Appl. No.: 12/850,098

(22) Filed: Aug. 4, 2010

(65) Prior Publication Data

US 2012/0032727 A1 Feb. 9, 2012

(51) Int. Cl.
*H02H 3/08* (2006.01)
*H01H 9/54* (2006.01)

(52) U.S. Cl.
CPC . *H01H 9/542* (2013.01); *H02H 3/08* (2013.01)
USPC .......................... 361/93.1; 361/101; 361/115

(58) Field of Classification Search
USPC ........................................................ 361/101
See application file for complete search history.

(56) References Cited

U.S. PATENT DOCUMENTS

| | | | | | |
|---|---|---|---|---|---|
| 3,330,992 | A | * | 7/1967 | Perrins | 361/13 |
| 3,430,063 | A | * | 2/1969 | Booth et al. | 361/13 |
| 4,271,452 | A | * | 6/1981 | Lee | 361/231 |
| 5,578,522 | A | * | 11/1996 | Nakamura et al. | 438/138 |
| 6,075,684 | A | * | 6/2000 | Duba et al. | 361/4 |
| 6,198,641 | B1 | * | 3/2001 | Åstrom et al. | 363/35 |
| 6,239,514 | B1 | | 5/2001 | Isberg et al. | |
| 6,974,720 | B2 | * | 12/2005 | Sumakeris et al. | 438/105 |
| 7,110,225 | B1 | * | 9/2006 | Hick | 361/8 |
| 7,544,970 | B2 | * | 6/2009 | Sugawara | 257/77 |
| 7,633,022 | B2 | | 12/2009 | Zöls | |
| 7,851,274 | B1 | * | 12/2010 | Shah | 438/139 |
| 2003/0183838 | A1 | | 10/2003 | Huang et al. | |
| 2004/0027734 | A1 | * | 2/2004 | Fairfax et al. | 361/2 |
| 2006/0130742 | A1 | * | 6/2006 | Carter et al. | 117/84 |
| 2010/0087699 | A1 | * | 4/2010 | Peterchev | 600/14 |
| 2010/0156513 | A1 | * | 6/2010 | Saldivar et al. | 327/536 |
| 2010/0214710 | A1 | * | 8/2010 | Kora | 361/101 |

FOREIGN PATENT DOCUMENTS

| | | |
|---|---|---|
| DE | 20 2005 007220 U1 | 9/2006 |
| EP | 0 633 584 A1 | 1/1995 |
| JP | 11234894 A | 8/1999 |

OTHER PUBLICATIONS

International Search Report for PCT/US2011/039341 mailed Sep. 13, 2011.
Agarwal, A. et al., "9 kV, 1 cmX1 cm SiC Super GTO Technology Development for Pulse Power," Proceedings of the IEEE Pulsed Power Conference, Jun. 28-Jul. 2, 2009, pp. 264-269.
International Preliminary Report on Patentability for International application PCT/US2011/039341 mailed Feb. 14, 2013, 7 pages.

* cited by examiner

*Primary Examiner* — Jared Fureman
*Assistant Examiner* — Terrence Willoughby
(74) *Attorney, Agent, or Firm* — Withrow & Terranova, P.L.L.C.

(57) ABSTRACT

A circuit breaker is provided that includes primary and secondary paths that extend between first and second terminals. The primary path extends between the first and second terminals and through a first switch. The secondary path extends between the first and second terminals and through the second switch and a semiconductor switching element. During normal operation, a control system maintains the first and second switches in closed position and the semiconductor switching element in blocking state. When a fault condition occurs in the load current, the control system detects the fault condition and sets the semiconductor switching element to conducting state. The control system then sets the first switch to open position such that the load current flows between the first and second terminals through the secondary path. The control system then sets the second switch to open position and the semiconductor switching element to blocking state.

35 Claims, 12 Drawing Sheets

CIRCUIT BREAKER

This invention was made with government support under W911NF-04-2-0022 awarded by the U.S. Army Research Laboratory. The Government has certain rights in the invention.

FIELD OF THE DISCLOSURE

The present disclosure relates to circuit breakers, and in particular to circuit breakers that employ semiconductor switching elements to assist with current interruption in response to a fault condition.

BACKGROUND

A circuit breaker is a special type of electrical switch, which is designed to protect other electrical circuitry from damage caused by an electrical fault, such as an overload condition, short circuit, or the like. In general, a circuit breaker allows current to pass from a power supply to load circuitry during normal operating conditions and will quickly react to prevent current from passing from the power supply to the load circuitry upon detection of a fault. Most circuit breakers incorporate a mechanical switch that controls the continuity between the power supply and the load circuitry. Under normal operating conditions, the mechanical switch is closed, and continuity is provided between the power supply and the load circuitry. When a fault is detected, the mechanical switch is opened, and continuity between the power supply and the load circuitry is electrically and mechanically broken. As such, the flow of current between the power supply and load circuitry is broken.

Circuit breakers are applied to both direct current (DC) and alternating current (AC) applications over extremely wide power ranges. Since circuit breakers are designed to be reset after being tripped in response to detecting a fault, the mechanical switches in the circuit breakers may be designed to be opened and closed many times. Depending on the application, the mechanical switch in the circuit breaker may need to be able to withstand hundreds, if not thousands, of openings and closings. As such, maintaining the integrity of the mechanical switch over numerous openings and closings is often a critical design requirement. However, numerous aspects of the mechanical switch and its operation tend to degrade the integrity of the mechanical switch with each opening and closing. For example, each impact that one contact makes against the other contact when the mechanical switch is closed may damage one or both of the contacts. The damage caused over numerous closings may degrade the performance of the mechanical switch or lead to a complete failure. Further, an arm or member that must move to place the contacts in and out of contact with one another when closing or opening may weaken or break over time, which may also lead to performance degradation or complete failure. To address these issues, designers are working to improve materials and the physical design of the mechanical switches.

Another destructive force that tends to degrade the integrity of a circuit breaker is the electrical arcing that occurs between the contacts of the mechanical switch before the contacts make contact with each other during closing of the mechanical switch, or after the contacts break contact with each other during the opening of the mechanical switch. When the voltage differential between contacts that are sufficiently close together is at a given level, an electrical arc is generated between the contacts. In essence, an electrical arc is the breakdown of a gas that resides between the contacts into a plasma. The resulting plasma in this instance is an ionized gas that tends to generate excessive current and heat at the points of arcing on the contacts. The heat from the arcing erodes the contacts, and over time, will also lead to performance degradation or complete failure of the mechanical switch, and thus the circuit breaker. The destructive effect of arcing increases as the voltages and currents handled by the circuit breaker increase.

Efforts have been made to replace the mechanical switches in the circuit breakers with semiconductor based switches to avoid the inherent issues associated with the mechanical switches. For high power applications, semiconductor solutions typically cannot compete with the voltage and current handling capability of a mechanical switch. Further, there are safety concerns with semiconductor switches not providing a clean and clear mechanical break, like that provided by mechanical switches, between the power source and the load circuitry.

Accordingly, there is a need for an efficient and effective circuit breaker that is capable of providing a mechanical break between the power source and the associated load circuitry while mitigating the contact erosion caused by plasma formation.

SUMMARY OF THE DETAILED DESCRIPTION

The present disclosure relates to a circuit breaker that includes primary and secondary paths that extend between first and second terminals. The primary path extends between the first and second terminals and through a first switch. The secondary path extends between the first and second terminals and through both the second switch and a semiconductor switching element. The first and second switches as well as the semiconductor switching element are controlled by a control system. During normal operation, the control system operates to maintain the first and second switches in a closed position and the semiconductor switching element in a blocking state. As such, any load current substantially flows between the first and second terminals through the primary path. Upon occurrence of a fault condition in the load current, the control system operates to detect the fault condition and set the semiconductor switching element to a conducting state. Upon setting the semiconductor switching element to the conducting state, the control system will set the first switch to an open position such that the load current substantially flows between the first and second terminals through the secondary path. Upon setting the first switch to the open position, the control system will set the second switch to the open position and the semiconductor switching element to the blocking state.

For high power applications, the semiconductor switching element may be formed from a silicon carbide (SiC) material system on a SiC substrate. The semiconductor switching element may include, but is not limited to, a thyristor, such as a gate turn-off (GTO) thyristor, and a transistor, such as an integrated gate bipolar transistor (IGBT). In certain embodiments, the semiconductor switching element is configured to handle voltages up to and exceeding 10-20 kilovolts and current densities of up to and exceeding 300 amperes per square centimeter. The circuit breaker may be configured for alternating current (AC) and direct current (DC) applications.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The discussion of the embodiments set forth below represents the necessary information to enable those skilled in the art to practice the embodiments and illustrates the best mode of practicing the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims. When an element such as a layer, structure, portion, region or substrate is referred to as being "on" or extending "onto" another element, it can be directly on or extend directly onto the other element, or intervening elements may also be provided. In contrast, if an element is referred to as being "directly on" or extending "directly onto" another element, there are no intervening elements present.

Figure 1:
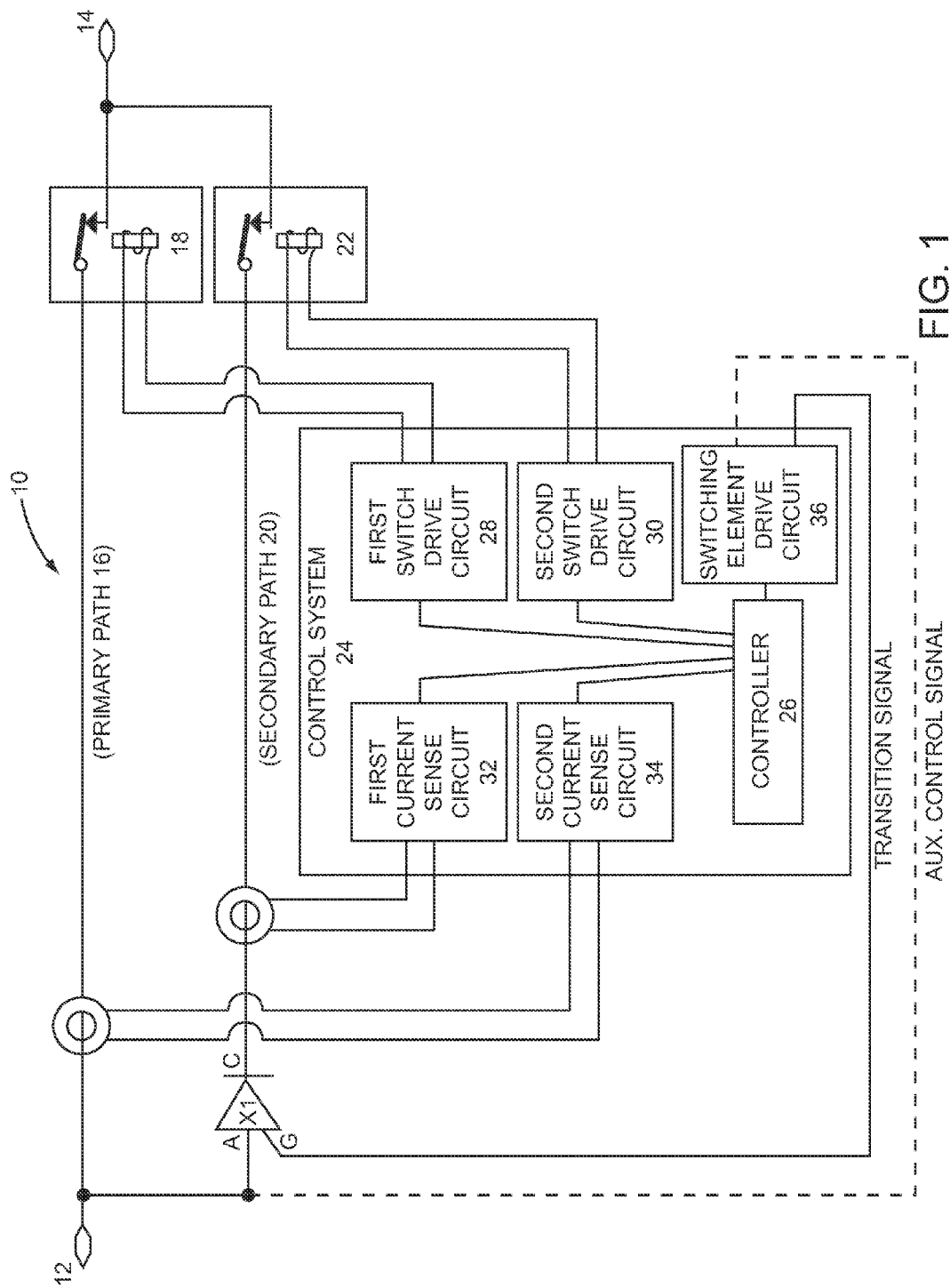
FIG. 1 illustrates a circuit breaker according to a first embodiment of the disclosure.

With reference to FIG. 1, an overview of a circuit breaker 10 according to a first embodiment of the disclosure is provided. The primary configuration of the circuit breaker 10 is described prior to describing its operation. In general, two current paths are provided between a first terminal 12 and a second terminal 14. The first current path is referred to as a primary path 16, and extends from the first terminal 12 to the second terminal 14 through a first switch 18. The primary path 16 is the main path for current to flow through the circuit breaker 10 during normal operation, when current flow is not interrupted between the first and second terminals 12, 14.

The other current path is referred to as a secondary path 20, and extends from the first terminal 12 to the second terminal 14 through a semiconductor-based switching element X1 and a second switch 22. As will be described further below, when a fault is detected, current flowing in the primary path 16 is temporarily redirected from the primary path 16 to the secondary path 20 before the circuit breaker 10 completely stops the flow of current between the first and second terminals 12, 14. The first and second switches 18, 22 are generally electronically controlled mechanical switches. In the illustrated embodiment, the switching element X1 is a gate turn-off (GTO) thyristor; however, as illustrated further below, the switching element X1 may take on various semiconductor device configurations, including but not limited to a transistor, such as an insulated gate bipolar transistor.

Overall operation of the circuit breaker 10 is controlled by a control system 24, which includes a controller 26 that is coupled to first and second switch drive circuits 28, 30, first and second current sense circuits 32, 34, and a switching element drive circuit 36. The first switch drive circuit 28 is capable of controlling the first switch 18 in response to a control signal provided by the controller 26, and the second drive circuit 30 is capable of controlling the second switch 22 in response to a control signal provided by the controller 26. In the illustrated example, the first and second switches 18, 22 are single pole single throw (SPST) mechanical relays, which are normally open and electronically actuated. As such, the controller 26 can individually and selectively open or close the first and second switches 18, 22, and therefore, selectively connect or disconnect the primary path 16 to the second terminal 14 as well as selectively connect or disconnect the secondary path 20 to the second terminal 14.

The first and second current sense circuits 32, 34 are configured to monitor the current flowing through the primary and second paths 16, 20, respectively, and provide an indication of at least the magnitude of the current flowing through the primary and secondary paths 16, 20 to the controller 26. Notably, monitoring the current flowing through the secondary path 20, which includes the switching element X1, is not required. Based on the current flow through the primary path 16 or the combination of current flow through both the primary and secondary current paths 16, 20, the controller 26 can determine whether a fault has occurred and trigger a process to interrupt current flow through the circuit breaker 10. The switching element drive circuit 36 is used to control the operation, and perhaps the state, of the semiconductor-based switching element X1. Under control of the controller 26, the switching element drive circuit 36 is capable of turning the switching element X1 on or off, and thus, allowing current to flow through the secondary path 20. Additional bias control may also be provided to assist with controlling the overall state of the semiconductor switching element X1, as will be described further below.

A normal thyristor is semiconductor device that includes four layers of alternating N- and P-type material and provides an anode, a cathode, and gate. A normal thyristor is considered a bi-stable switch, which begins to conduct current when a positive current pulse is applied to the gate and continues to conduct current as long as the anode and cathode are forward biased. Even after the positive current pulse is removed from the gate, the normal thyristor will continue to conduct current. The normal thyristor will continue to conduct current until the anode and cathode are reverse biased or the current flowing through the normal thyristor falls below a certain threshold. As such, the normal thyristor can be turned on, or placed in a forward conducting state, by applying an appropriate signal to the gate; however, it cannot be turned off, or placed in a forward blocking state, by applying an appropriate gate signal.

In contrast with a normal thyristor, a GTO thyristor can be both turned on and off through application of an appropriate gate signal. A GTO thyristor is turned on, or placed in a forward conducting state, by applying a positive current pulse to the gate; and turned off, or placed in a forward blocking state, by applying a negative voltage relative to the gate and cathode. As such, a GTO thyristor will conduct current when a positive current pulse is applied to the gate and will continue to conduct current, even if the positive current pulse is removed from the gate, until:

1) a negative voltage is applied to the gate;
2) the anode and cathode are reversed biased; or
3) the current flowing through the GTO thyristor falls below a certain threshold.

Accordingly, the GTO thyristor affords the ability to conduct or block current through application of appropriate gate signals. Although a normal thyristor will remain on when the positive voltage between the gate and cathode is removed, GTO thyristors generally perform better in the forward conducting state, if positive current remains applied to the gate.

Figure 2:
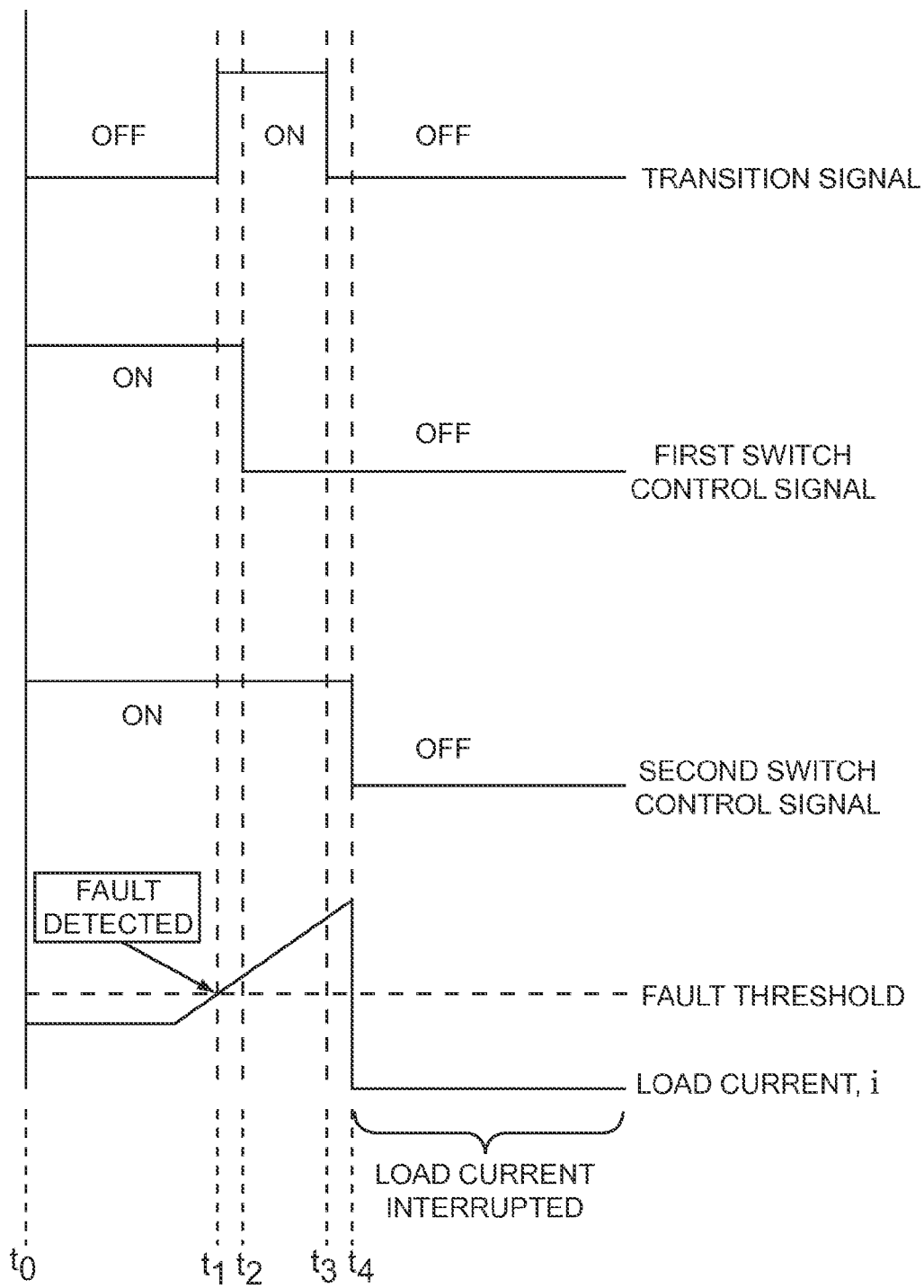
FIG. 2 is a timing diagram illustrating operation of a circuit breaker when a fault is detected.
Figure 3:
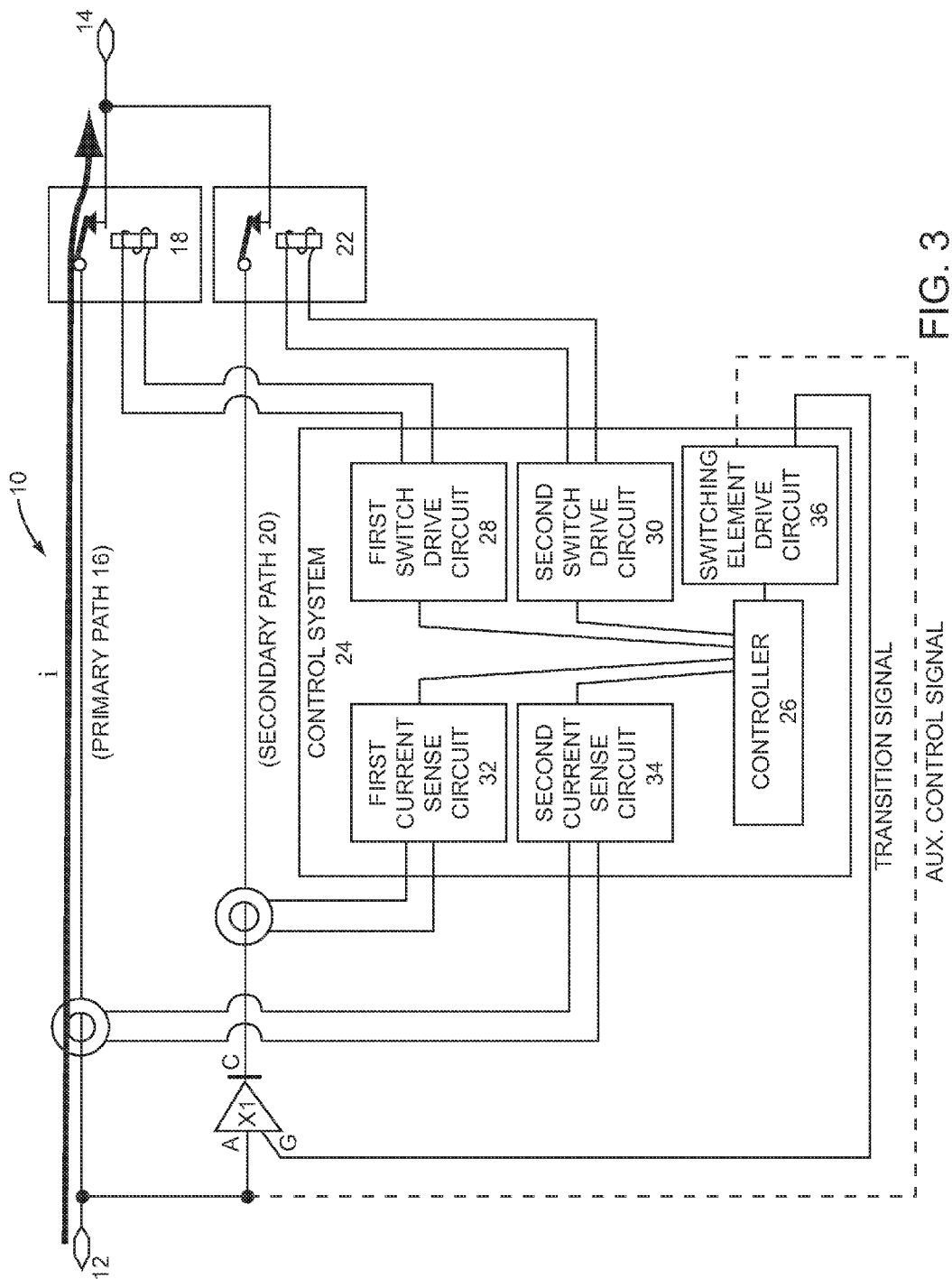
FIG. 3 illustrates the circuit breaker of the first embodiment prior to a fault occurring.
Figure 4:
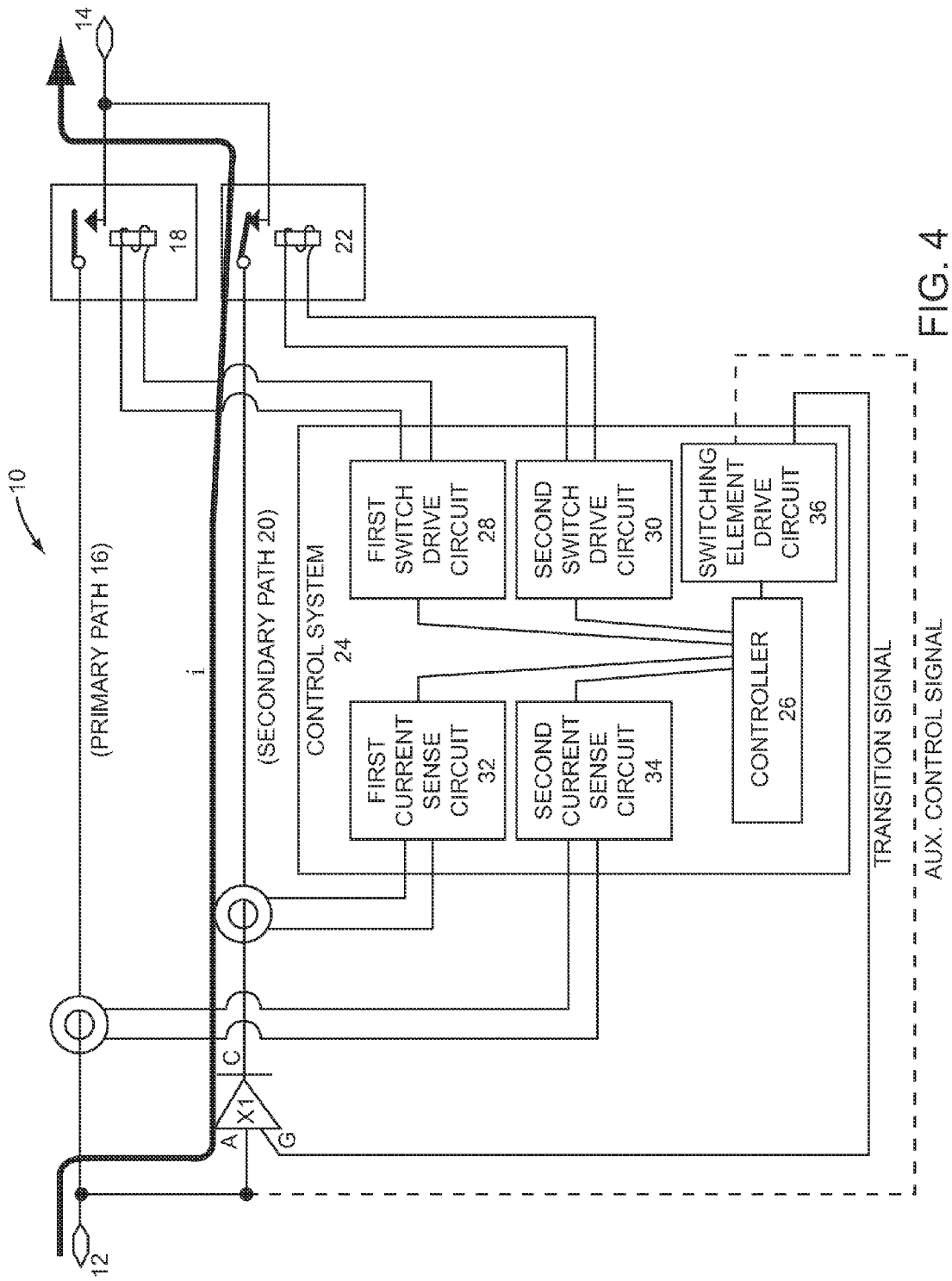
FIG. 4 illustrates the circuit breaker of the first embodiment after a load current is transitioned from a primary path to a secondary path in response to detecting the fault.
Figure 5:
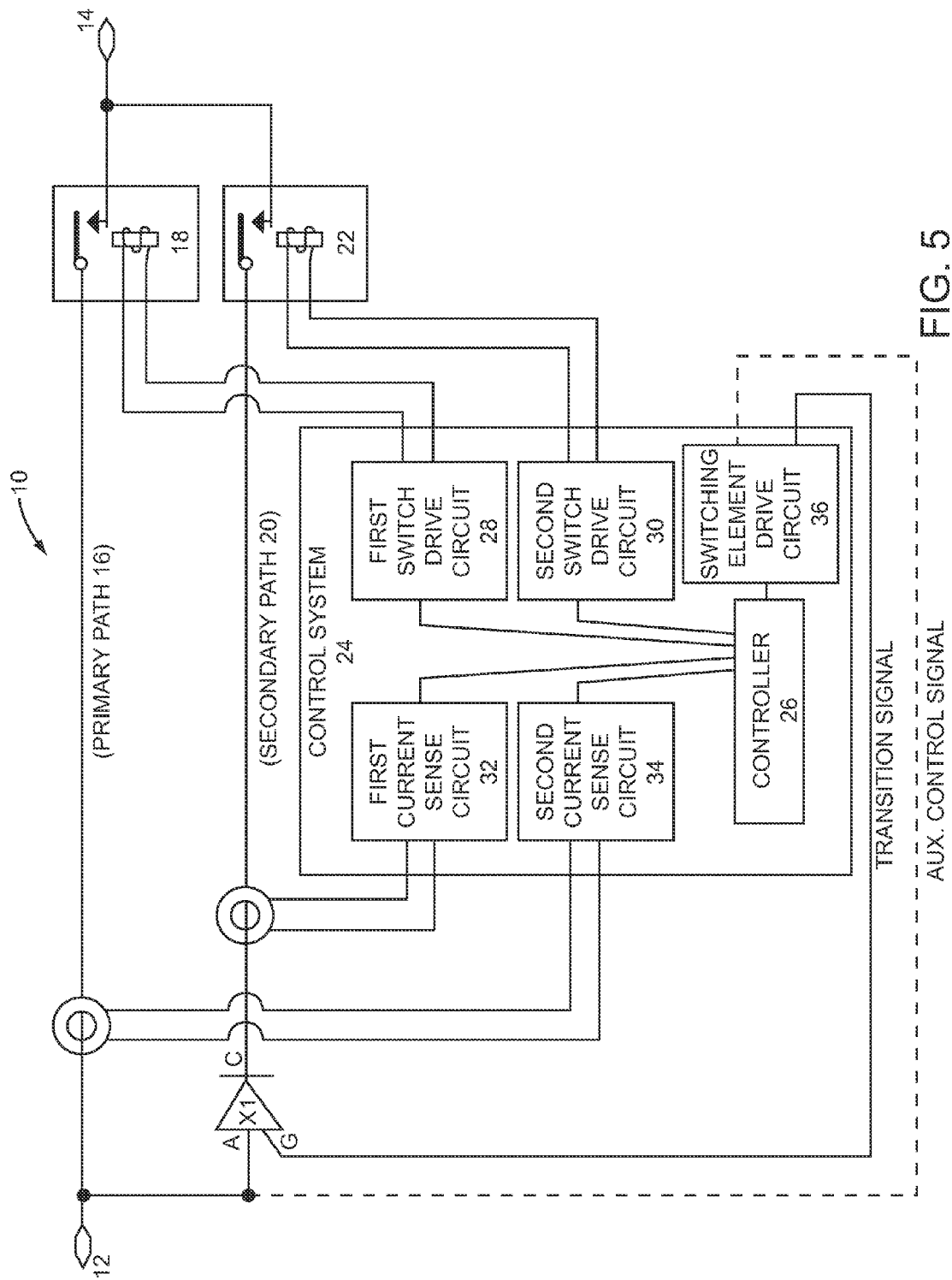
FIG. 5 illustrates the circuit breaker of the first embodiment upon completion of an interrupt process that was triggered in response to detecting the fault.

Operation of the circuit breaker 10 illustrated in FIG. 1 is now described in association with the timing diagram of FIG. 2 and associated FIGS. 3 through 5. The switching element X1 is a high power GTO thyristor in this embodiment. The timing diagram of FIG. 2 includes a transition signal, which is provided by the switching element drive circuit 36 under the control of the controller 26 and used to drive the gate (G) of the switching element X1. For the transition signal, a logic low will turn the switching element X1 off, and thus provide a blocking state. A logic high for the transition signal will turn the switching element X1 on, and thus provide a conducting state. The timing diagram also includes first and second switch control signals, which are provided by the first and second switch drive circuits 28, 30, respectively, under control of the controller 26. For either of the first and second switch control signals, a logic high corresponds to a state where the corresponding one of the first and second switches 18, 22 is closed. A logic low corresponds to a state where the corresponding one of the first and second switches 18, 22 is open. Notably, the illustrated logic levels are for reference only and different logic levels may be used to provide asserted and de-asserted states for the various components. Further, the load current i in the timing diagram of FIG. 2 represents the magnitude of the load current passing through the circuit breaker 10 as measured by the either one or both of the first and second current sense circuits 32, 34. The bold lines in the associated FIGS. 3 through 5 represent the path the load current i takes through the circuit breaker 10 at different points of operation and the arrows indicate the direction of current flow.

In the following example, the flow of the load current i through the circuit breaker 10 from the first terminal 12 to the second terminal 14 is interrupted, or prevented, if the load current i exceeds a given fault threshold. In this example, assume for normal operation that when the magnitude of the load current i is below the fault threshold, the first and second switches 18, 22 are both closed, and the switching element X1 is in a blocking, or open, state. As illustrated in the timing diagram of FIG. 2, normal operation occurs from time $t_0$ to time $t_1$. During this time, the transition signal is initially a logic low such that the switching element X1 is in a blocking state, while the first and second switch control signals are a logic high such that the first and second switches 18, 22 are closed. Accordingly, the load current i will flow from the first terminal 12 to the second terminal 14 through the primary path 16 and the first switch 18, as illustrated in FIG. 3. Being in a blocking state, the switching element X1 will effectively block the load current i from flowing through the secondary path 20, even though the second switch 22 is closed. Also during this time, the first current sense circuit 32 is quantifying the magnitude of the load current i flowing through the primary path 16 and passing the resultant measurements to the controller 26.

From time $t_0$ to time $t_1$, the magnitude of the load current i remains below the fault threshold. However, assume that at time $t_1$, the magnitude of the load current i exceeds the fault threshold. Since the controller 26 is effectively monitoring the magnitude of the load current i flowing through the primary path 16 via the first current sense circuit 32, the controller 26 is able to quickly detect that the magnitude of the load current i flowing through the primary path 16 has exceeded the fault threshold and initiates an interrupt process. For the interrupt process, the controller 26 will cause the switching element drive circuit 36 to change the transition signal to a logic high at time $t_1$, which will turn the switching element X1 to a conducting state. Notably, turning on a switching element X1, which takes the form of a GTO thyristor, is generally not instantaneous and may take a few microseconds. At time $t_2$, which may occur after sufficient time for the GTO thyristor to turn on and assume a conducting state, the controller 26 will cause the first switch drive circuit 28 to transition the first switch control signal from a logic high to a logic low, which will cause the first switch 18 to open.

When the first switch 18 opens, the load current i is redirected from the primary path 16 to the secondary path 20, as illustrated in FIG. 4. The secondary path 20 extends between the first and second terminals 12 and 14 and includes the switching element X1 and the second switch 22. As such, the load current i will flow from the anode (A) to the cathode (C) of the GTO thyristor (switching element X1) and through the second switch 22. Since the first switch 18 in the primary path 16 is open, no current can flow to the second terminal via the primary path 16.

In certain embodiments, the switching element X1 is capable of acting as a voltage clamp, which is the case for diode-type devices such as a GTO thyristor. When the switching element X1 is in a conducting state and the second switch 22 is closed, the switching element X1 is effectively coupled across the respective terminals of the first switch 18. As such, the switching element X1 effectively limits the voltage appearing across the first switch 18 before, during, and after it is opened from a closed state to the rated clamping voltage. This clamping voltage for the switching element X1 can be on the order of about 25 volts or less, and even 10 volts or less with certain GTO thyristors. Accordingly, the first switch 18 is opened under relatively low voltage conditions when a fault is detected, and thus, the inherent damage caused by opening the first switch 18 under the high voltage conditions that would otherwise be present if the load current i were flowing through the first switch 18 is mitigated.

At time $t_3$, which occurs after sufficient time has passed for the first switch 18 to open, the controller 26 will cause the switching element drive circuit 36 to change the transition signal to a logic low, which will turn the switching element X1 to a blocking state. The switching element X1 may take a few microseconds to transition from the conducting state to the blocking state. Once the switching element X1 fully transitions to a blocking state, the first switch 18 is open, and the switching element X1 is in a blocking state. As such, flow of the load current i to the second terminal 14 through the circuit breaker 10 is completely interrupted. Neither the primary path 16 nor the secondary path 20 is electrically coupled to the second terminal 14.

At time $t_4$, the controller 26 will cause the second switch drive circuit 30 to finally transition the second switch control signal from a logic high to a logic low, which causes the second switch 22 to open. Since the switching element X1 is blocking the flow of the load current i in the secondary path 20, the second switch 22 is opened under relatively low voltage conditions. As with the opening of the first switch 18, the inherent damage caused by opening the second switch 22 under the high voltage conditions that would otherwise be present if the load current i were flowing through the second switch 22 is mitigated. In an alternative embodiment, the switch 22 may be opened before the switching element X1 is transitioned back to a blocking state. At this point, both of the switches 18 and 22 are open as illustrated in FIG. 5, and no current is flowing from the first terminal 12 to the second terminal 14.

Although not illustrated in FIGS. 1 and 3 through 5, a resistor or resistive network may be provided across the switching element X1 to dissipate inductive kick-back voltages that occur across the switching element X1 as the switching element X1 is turned off during the interrupt process. Further, an auxiliary control signal may be used to assist the transition of states for the switching element X1. For example, if the switching element X1 is a GTO thyristor, the auxiliary control signal may be provided to the anode of the GTO thyristor to ensure the GTO resistor is reverse biased, and thus returned to a blocking state after the switching element X1 is turned off during the interrupt process.

Figure 6:
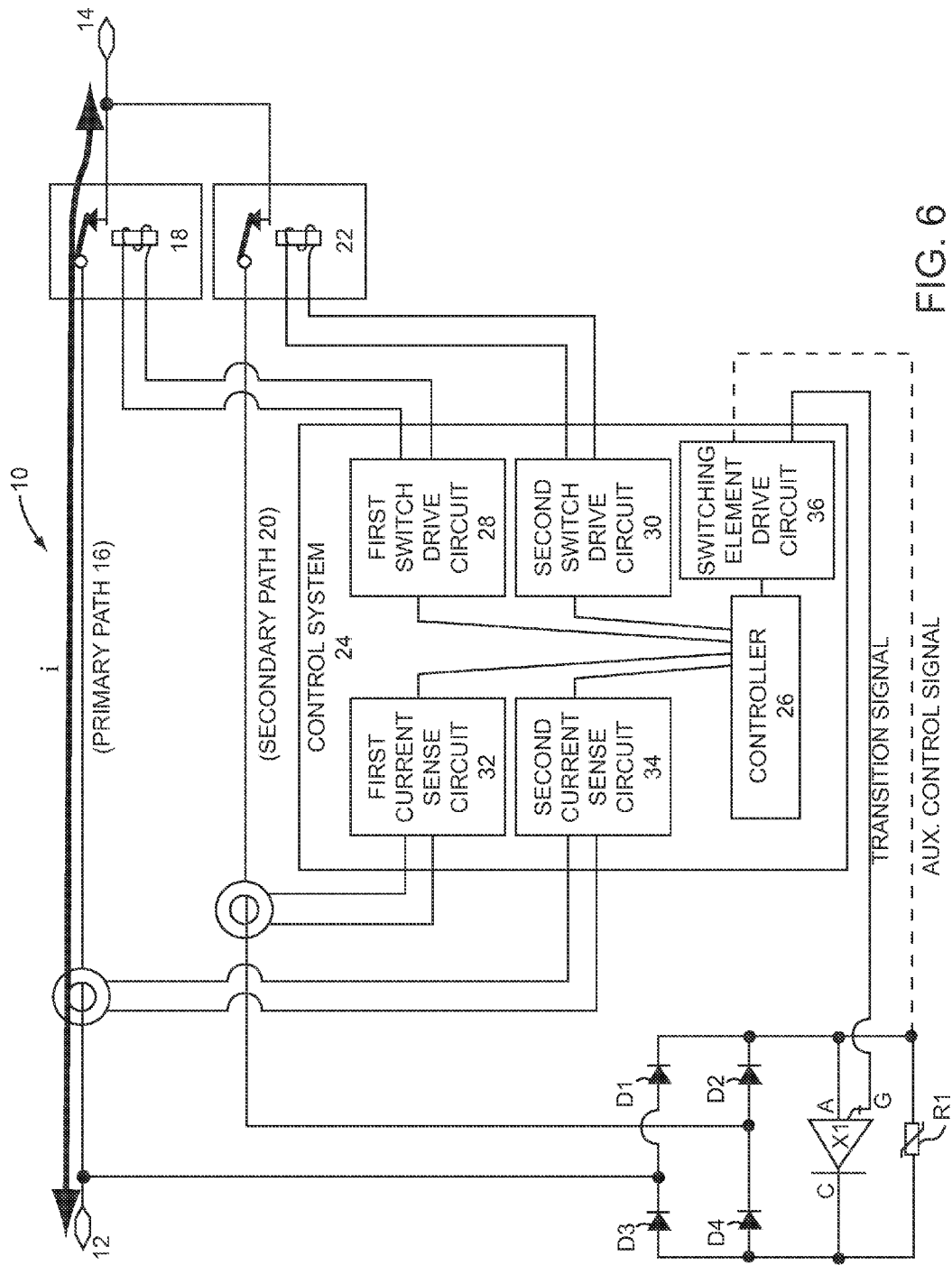
FIG. 6 illustrates the circuit breaker according to a second embodiment of the disclosure prior to a fault occurring.

The first embodiment illustrated in FIGS. 1 and 3 through 5 is primarily directed to a circuit breaker 10 that provides protection for load current i, which flows in one direction. The second embodiment illustrated in FIGS. 6 through 9 provides for protection for bi-directional current flow. The primary difference between the first and second embodiments lies in the configuration of the circuitry that provides the switching element X1. As illustrated in FIG. 6, the switching element X1 is provided in association with a bridge network, which includes diodes D1 through D4, the switching element X1, and a resistor R1. The bridge network of diodes D1 through D4 allows current to be redirected through the switching element X1 in the same forward biased direction during an interrupt process regardless of the overall direction of current flow through the circuit breaker 10. The diodes D1 through D4 may be PIN diodes. PIN diodes are diodes that have a wide, lightly doped near intrinsic semiconductor region between the p-type semiconductor region and the n-type semiconductor regions. The presence of the intrinsic region makes PIN diodes better able to handle high voltage power electronics applications.

As described above, two current paths are provided between the first terminal 12 and the second terminal 14. The primary path 16 extends from the first terminal 12 to the second terminal 14 through a first switch 18 for current that flows in either direction between the first and second terminals 14. The primary path 16 is the main path for current to flow through the circuit breaker 10 during normal operation. For current that is flowing from the first terminal 12 to the second terminal 14, the secondary path 20 extends from the first terminal 12 to the second terminal 14 through the diode D1, switching element X1, diode D4, and a second switch 22. For current that is flowing from the second terminal 14 to the first terminal 12, the secondary path 20 extends from the second terminal 14 to the first terminal 12 through the second switch 22, diode D2, switching element X1, and diode D3.

In the following example, the timing diagram of FIG. 2 remains applicable and additional reference will be made to FIGS. 6 through 9. As provided in FIG. 6, the first and second switches 18, 22 are both closed, and the switching element X1 is in a blocking state when the magnitude of the load current i is below a fault threshold. As illustrated in the timing diagram of FIG. 2, normal operation occurs from time $t_o$ to time $t_1$. During this time, the transition signal is initially a logic low such that the switching element X1 is in a blocking state, while the first and second switch control signals are a logic high such that the first and second switches 18, 22 are closed. Accordingly, the load current i may flow from the first terminal 12 to the second terminal 14 through the primary path 16 and the first switch 18. Being in a blocking state, the switching element X1 will effectively block the load current i from flowing through the secondary path 20, even though the second switch 22 is closed.

From time $t_0$ to time $t_1$, the magnitude of the load current i remains below the fault threshold. However, assume that at time $t_1$, the magnitude of the load current i exceeds the fault threshold. Since the controller 26 is effectively monitoring the magnitude of the load current i flowing through the primary path 16 via the first current sense circuit 32, the controller 26 is able to quickly detect that the magnitude of the load current i flowing through the primary path 16 has exceeded the fault threshold and initiates an interrupt process. For the interrupt process, the controller 26 will cause the switching element drive circuit 36 to change the transition signal to a logic high at time $t_1$, which will transition the switching element X1 to a conducting state. At time $t_2$, which may occur after sufficient time for the GTO thyristor to transition to a conducting state, the controller 26 will cause the first switch drive circuit 28 to transition the first switch control signal from a logic high to a logic low, which will cause the first switch 18 to open.

Figure 7:
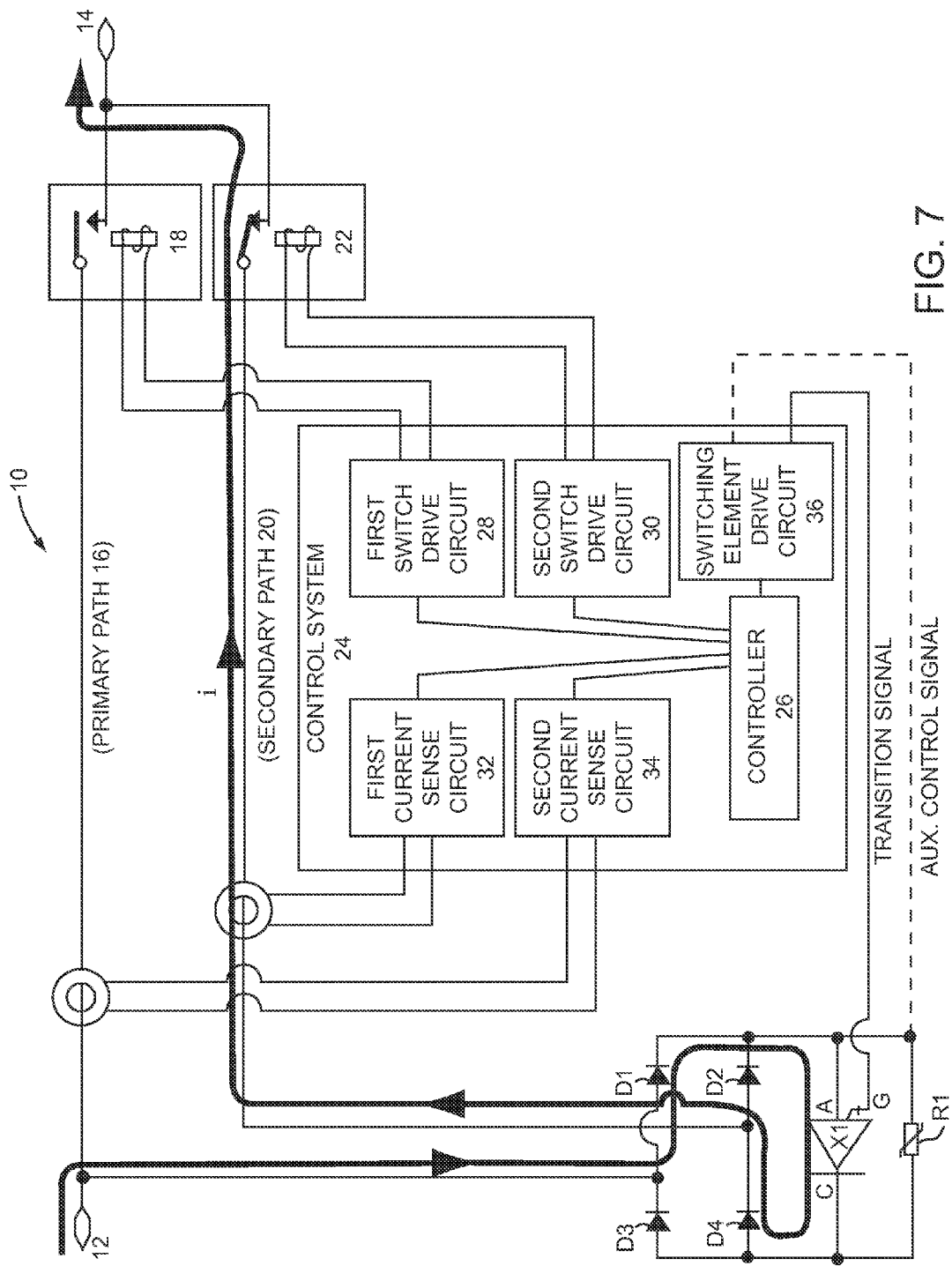
FIG. 7 illustrates the circuit breaker of the second embodiment after a load current is transitioned from a primary path to a secondary path in response to detecting the fault wherein the load current is flowing in a first direction through the circuit breaker.
Figure 8:
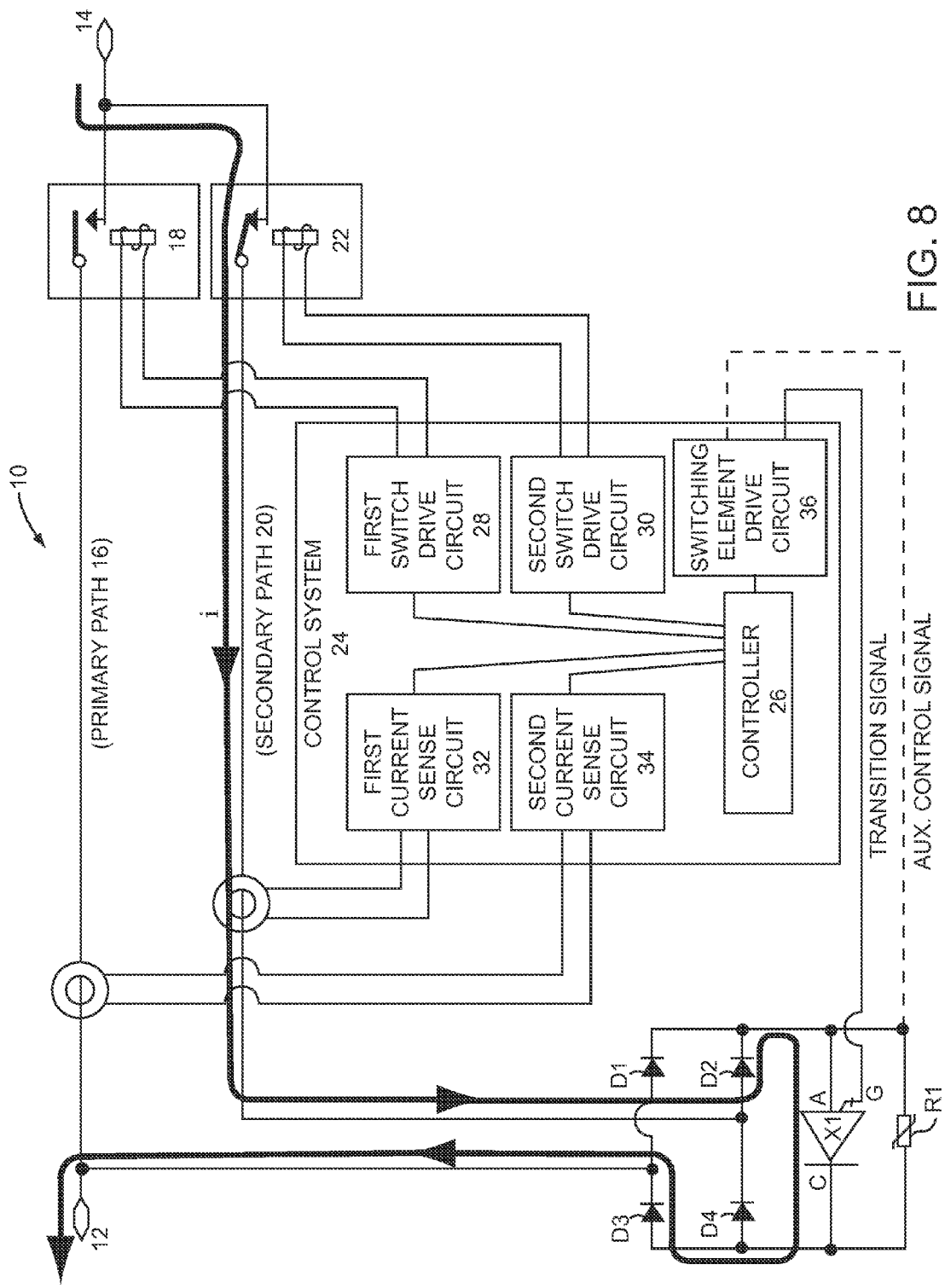
FIG. 8 illustrates the circuit breaker of the second embodiment after a load current is transitioned from a primary path to a secondary path in response to detecting the fault wherein the load current is flowing in a second direction through the circuit breaker.

When the first switch 18 opens, the load current i is redirected from the primary path 16 to the secondary path 20, as illustrated in FIG. 7. The secondary path 20 extends from the first terminal 12 to the second terminal 14 through diode D1, the switching element X1, diode D4, and the second switch 22. As such, the load current i will flow from the anode (A) to the cathode (C) of the GTO thyristor (switching element X1) and through the second switch 22. Since the first switch 18 in the primary path 16 is open, no current can flow to the second terminal 14 via the primary path 16. If the load current i is flowing from the second terminal 14 to the first terminal 12, the secondary path 20 is slightly different. As illustrated in FIG. 8, the secondary path 20 extends from the second terminal 14 to the first terminal 12 through the second switch 22, diode D2, the switching element X1, and diode D3. Even though the flow of the load current i has been reversed, the bridge network allows the load current i to flow from the anode (A) to the cathode (C) of a GTO thyristor (switching element X1) in a forward biased direction.

When the switching element X1 is in a conducting state and the second switch 22 is closed, the switching element X1 is effectively coupled across the respective terminals of the first switch 18. As such, the switching element X1 limits the voltage appearing across the first switch 18 before, during, and after it is opened from a closed state to the rated clamping voltage. At time $t_3$, which occurs after sufficient time has passed for the first switch 18 to open, the controller 26 will cause the switching element drive circuit 36 to change the transition signal to a logic low, which will turn the switching element X1 off. Once turned off, the switching element X1 returns to a blocking state. Once the switching element X1 fully transitions to a blocking state, the first switch 18 is open and the switching element X1 is in a blocking state. As such, the flow of the load current i in either direction is completely interrupted. Neither the primary path 16 nor the secondary path 20 is electrically coupled to the second terminal 14.

Figure 9:
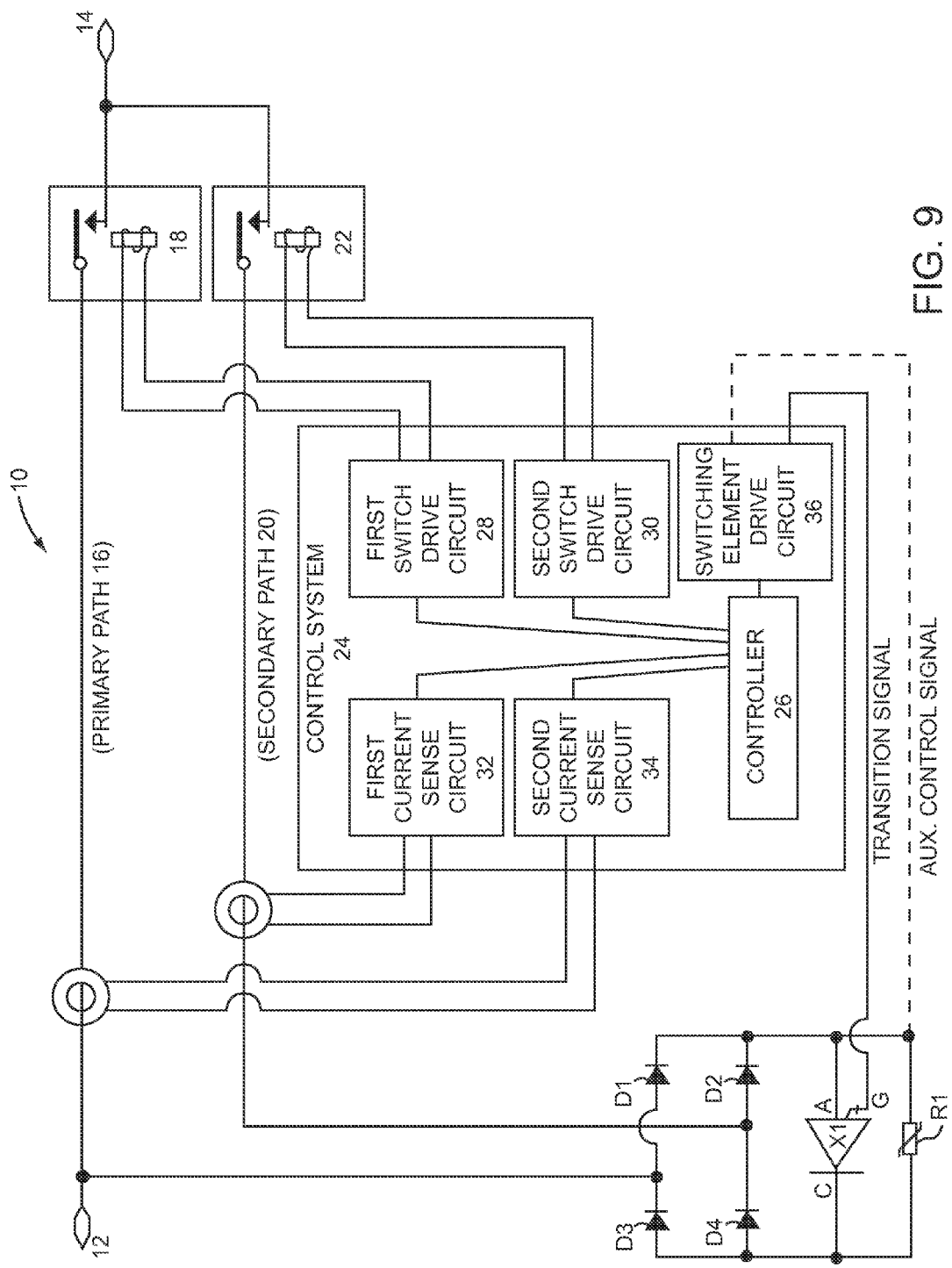
FIG. 9 illustrates the circuit breaker of the second embodiment upon completion of an interrupt process that was triggered in response to detecting the fault.

At time $t_4$, the controller 26 will cause the second switch drive circuit 28 to finally transition the second switch control signal from a logic high to a logic low, which causes the second switch 22 to open. Since the switching element X1 is blocking the flow of the load current i in the secondary path 20, the second switch 22 is opened under relatively low voltage conditions. As with the opening of the first switch 18, the inherent damage caused by opening the second switch 22 under the high voltage conditions that would otherwise be present if the load current i were flowing through the second switch 22 is mitigated. At this point, both of the switches 18 and 22 are open as illustrated in FIG. 9, and no current is flowing from the first terminal 12 to the second terminal 14.

As illustrated in FIGS. 6 through 9, a variable resistor R1 is provided across the switching element X1 to dissipate inductive kick-back voltages that occur across the switching element X1 as the switching element X1 and the first and second switches 18, 22 are turned on or off during the interrupt process. As noted with the previous embodiment, an auxiliary control signal may be used to assist the transition of states for the switching element X1.

In either of the first embodiment of FIGS. 1 through 5 or the second embodiment of FIGS. 6 through 9, the process may be reversed to effectively close the circuit breaker 10 and restore the flow of current between the first and second terminals 12, 14. For example, the controller 26 may operate to initially close the second switch 22, and once the second switch 22 is closed, turn the switching element X1 on to a forward conducting state. At this point, the load current i will flow along the secondary path 20. Further, the switching element X1 is effectively coupled across the respective terminals of the first switch 18 and will once again act as a voltage clamp across the terminals of the first switch 18. Providing this clamping function reduces the voltage that appears across the respective contacts of the first switch 18, and thus avoids the damage that is inherent in closing a switch under high voltage conditions. Once the second switch 22 is closed and the switching element X1 is in the conducting state, the controller 26 may operate to close the first switch 18. Once the first switch 18 is closed, the load current i will flow along the primary path 16 due to the resistance provided by the switching element X1 in the secondary path 20. The controller 26 will then operate to transition the switching element X1 back to a forward blocking state. At this point, the circuit breaker 10 is passing the load current i and is ready to detect a fault. Again, the order in which the switching element X1 is turned on and the second switch 22 is closed may be reversed.

Figure 10:
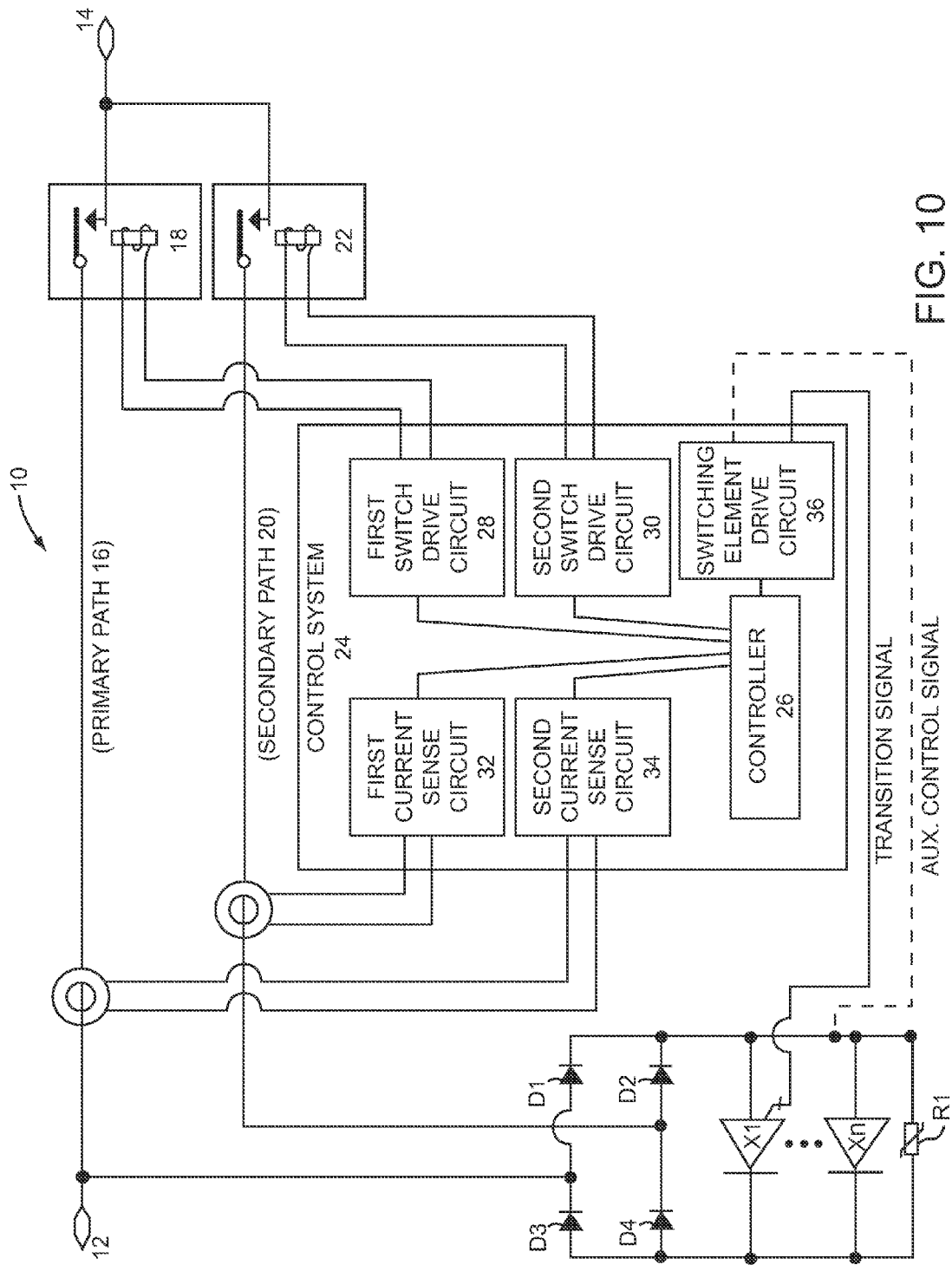
FIG. 10 illustrates a circuit breaker according to a third embodiment of the disclosure.
Figure 11:
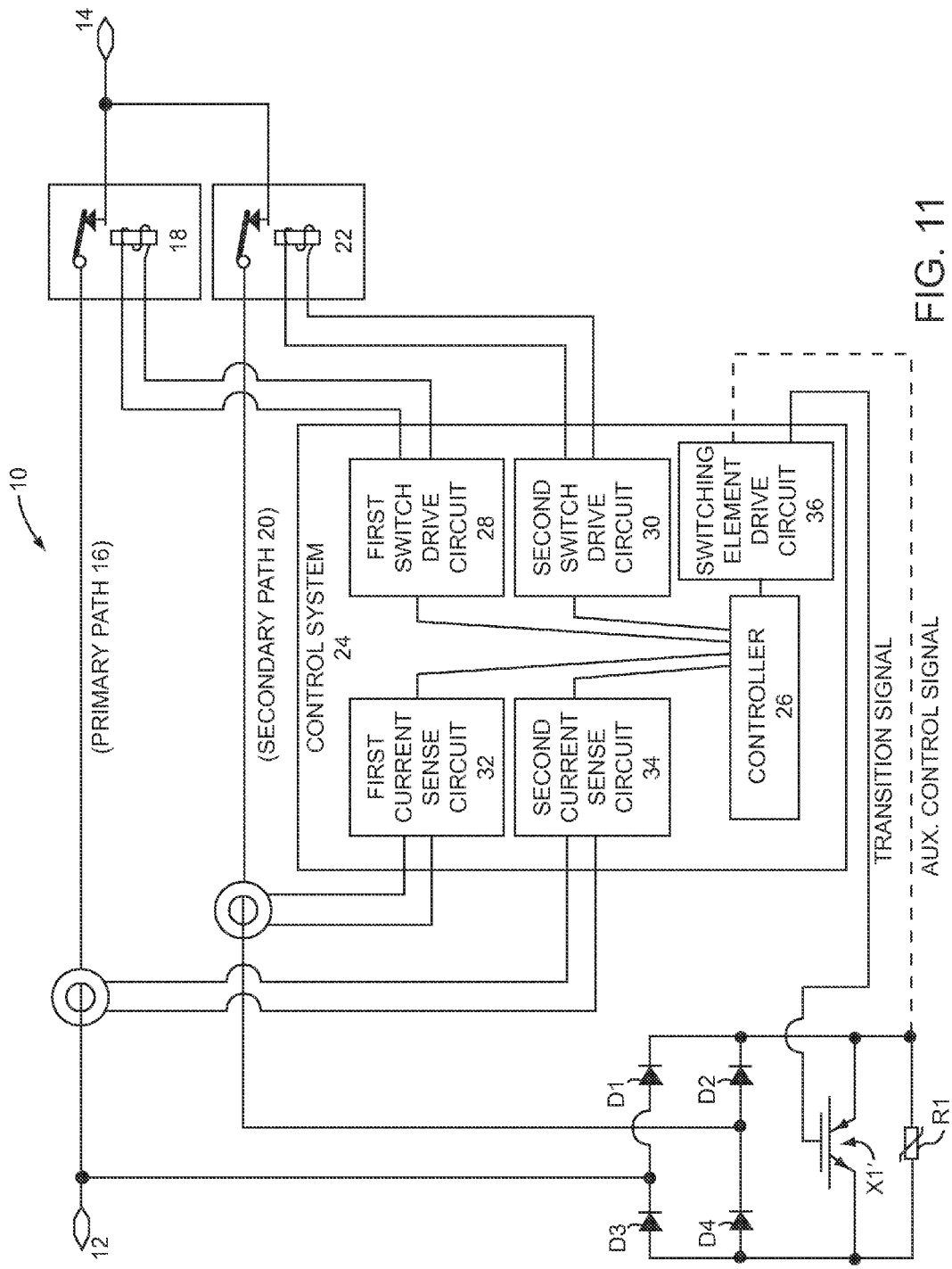
FIG. 11 illustrates a circuit breaker according to a fourth embodiment of the disclosure.

In the prior embodiments, only one switching element X1 was provided; however, multiple switching elements Xn may be stacked in parallel with one another to increase current handling capabilities. Such an embodiment is illustrated in FIG. 10. Although GTO thyristors have been illustrated in the prior embodiments, other semiconductor switching elements X1 may be employed. The alternatives to GTO thyristors include, but are not limited to: transistors, such as IGBTs, MOSFETs, BJTs, JFETs, including Static Induction Transistors, and FCTs (Field Controlled Thyristors; essentially a conductivity modulated JFET, also known as Field Controlled Diodes and Static Induction Thyristors). FIG. 11 illustrates an embodiment where an IGBT is used as a switching element X1'.

The embodiments disclosed herein are particularly useful in high voltage power electronics applications wherein the circuit breaker 10 handles voltages well in excess of five kilo-volts (5 kV) and current in excess of one kilo-amperes (1 kA). For such high voltage applications, the use of SiC-based switching elements X1, and in particular SiC-based GTO thyristors, has proven exceptionally beneficial. However, other material systems may be employed, assuming sufficient power handling capability is afforded for the intended application. An exemplary SiC-based GTO thyristor, which has been developed by Cree, Inc., is described below. Cree Inc. is located at 3026 E. Cornwallis Rd., Research Triangle Park, N.C. 27709 and is the assignee of the present application.

Figure 12:
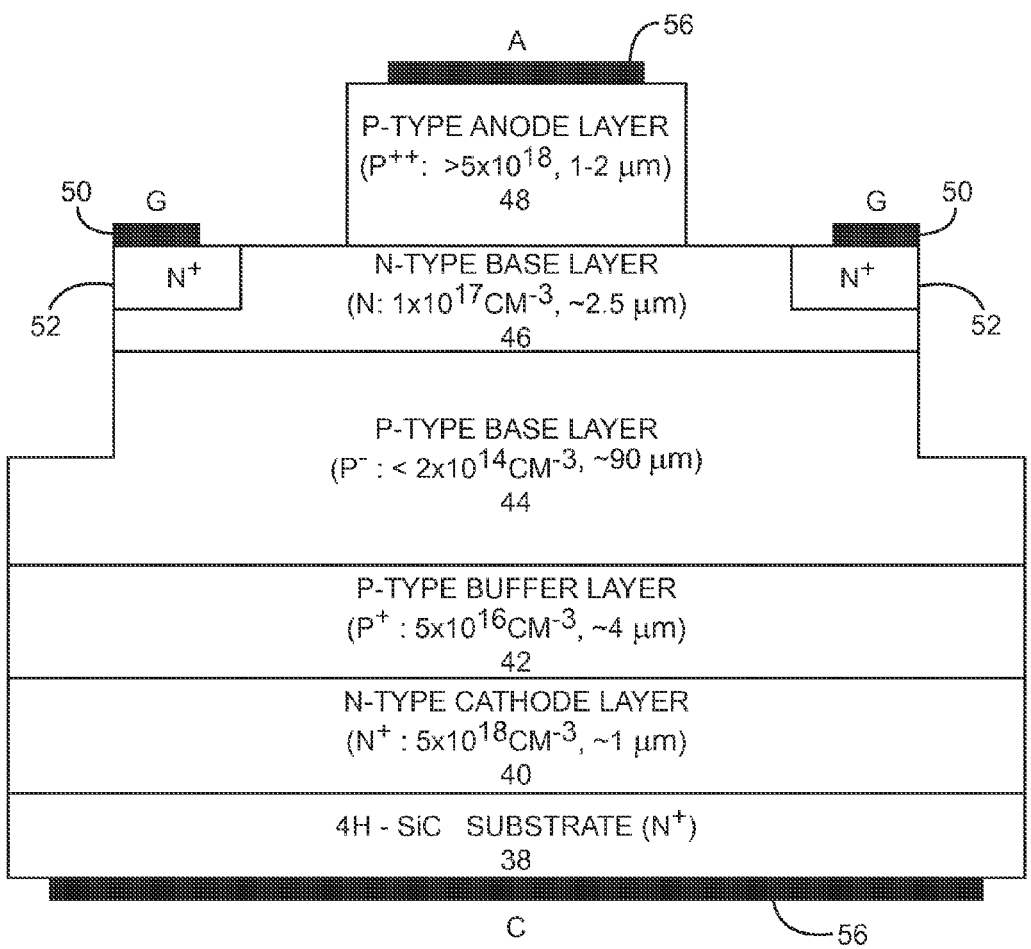
FIG. 12 illustrates an epitaxial structure of a gate turn-off (GTO) thyristor according to an embodiment of the disclosure.

An exemplary epitaxial structure for GTO thyristor is illustrated in FIG. 12. A thyristor, such as a GTO thyristor, includes four primary layers of alternating N- and P-type material and provides an anode, a cathode and gate. Each of the primary layers may be formed from one or more epitaxial layers. Notably, other layers that are not specifically shown may be provided between any adjacent layers in the illustrated embodiment. The silicon carbide (SiC) epitaxial structure is built upon a 4H-SiC substrate 38, which is heavily doped ($N^+$) with an n-type impurity at a concentration in the range of $1 \times 10^{17}$ cm$^{-3}$ to $1 \times 10^{19}$ cm$^{-3}$. An n-type cathode layer 40 is formed over the substrate 38 and is shown as being heavily doped ($N^+$) with an n-type impurity at a concentration around about $5 \times 10^{18}$ cm$^{-3}$. The dopant levels may vary depending on desired device characteristics and will usually fall within a range between about $1 \times 10^{17}$ cm$^{-3}$ to $1 \times 10^{19}$ cm$^{-3}$. The n-type cathode layer 40 is shown as being one (1) micron thick, but will usually fall within a range between about 0.2 and five (5) microns. A p-type buffer layer 42 is formed over the n-type cathode layer 40 and is shown as being heavily doped ($P^+$) with a p-type impurity at a concentration of about $5 \times 10^{16}$ cm$^{-3}$. The dopant levels may vary depending on desired device characteristics and will usually fall within a range between about $1 \times 10^{16}$ cm$^{-3}$ to $1 \times 10^{17}$ cm$^{-3}$. The p-type buffer layer 42 is shown as being about four (4) microns thick, but will usually fall within a range between about one (1) and ten (10) microns.

A p-type base layer 44 is formed over the p-type buffer layer 42 and is shown as being lightly doped ($P^-$) with a p-type impurity at a concentration less than about $2 \times 10^{14}$ cm$^{-3}$. The dopant levels may vary depending on desired device characteristics and will usually be less than about $1 \times 10^{15}$ cm$^{-3}$. The p-type base layer 44 is shown as being about 90 microns thick, but will usually fall within a range between about 50 and 150 microns. An n-type base layer 46 is formed over the p-type type layer 44 and is shown as being doped (N) with an n-type impurity at a concentration of about $2.5 \times 10^{17}$ cm$^{-3}$. The dopant levels may vary depending on desired device characteristics and will usually fall within a range between about $5 \times 10^{16}$ cm$^{-3}$ to $1 \times 10^{18}$ cm$^{-3}$. The n-type base layer 46 is shown as being about 2.5 microns thick, but will usually fall within a range between about one (1) and ten (10) microns. For the anode portion, a p-type anode layer 48 is formed over the n-type base layer 46 and is shown as being very heavily doped ($P^{++}$) with a p-type impurity at a concentration greater than about $5 \times 10^{18}$ cm$^{-3}$. The first p-type layer 42 is shown as being between about one (1) and two (2) microns thick, but will usually fall within a range between about 0.5 and five (5) microns.

Ohmic contacts 50 for the gate may be formed from annealed nickel or other appropriate conductor on or in the n-type base layer 46. As illustrated, the gate ohmic contacts 50 are formed on a region 52 in the n-type base layer 46 that was heavily doped with an n-type impurity. An ohmic contact 54 for the anode may also be formed from annealed nickel or other appropriate conductor on the p-type anode layer 48. An ohmic contact 56 for the cathode may be formed on the backside of the substrate 38 from annealed nickel or other appropriate conductor.

With this configuration, the GTO thyristor can handle voltages greater than ten (10) kV to 20 kV and current densities of 300 amps/cm$^2$ to 600 amp/cm$^2$ or more. This directly corresponds to the SiC-based GTO thyristor being able to control very high currents, which can exceed 3 kA or more. Further, the gate to anode breakdown voltage may exceed 100 volts, and even 150 volts in certain configurations. Other GTO thyristors are expected to have voltage ratings of 20 kV to 30 kV or more. Notably, these SiC based thyristors provide significant improvements over traditional Si-based thyristors with respect to their power handling and current switching capabilities, and will allow for the construction of circuit breakers that are applicable to high power settings. For further information regarding the GTO thyristor of FIG. 11, reference is made to "9 kV, 1 cm×1 cm SiC SUPER GTO TECHNOLOGY DEVELOPMENT FOR PULSE POWER," A. Agarwal et al., the disclosure of which is incorporated herein by reference.

Those skilled in the art will recognize improvements and modifications to the embodiments of the present disclosure. All such improvements and modifications are considered within the scope of the concepts disclosed herein and the claims that follow.

What is claimed is:

1. A circuit breaker comprising:
   a first terminal and a second terminal;
   a first switch and a second switch;
   a semiconductor switching element formed from a silicon carbide material system, wherein the semiconductor switching element is capable of handling voltages exceeding about 10 kilvolts;
   a primary path extending between the first terminal and the second terminal and through the first switch; and
   a secondary path extending between the first terminal and the second terminal and through the second switch and the semiconductor switching element such that during normal operation, the first switch and the second switch are maintained in a closed position and the semiconductor switching element is maintained in a blocking state such that load current substantially flows between the first terminal and the second terminal through the primary path.

2. The circuit breaker of claim 1 wherein the semiconductor switching element is a gate turn-off (GTO) thyristor.

3. The circuit breaker of claim 2 wherein the GTO thyristor is capable of handling voltages exceeding about 20 kilovolts.

4. The circuit breaker of claim 2 wherein the GTO thyristor is capable of blocking and passing current associated with a current density exceeding 300 amperes per square centimeter.

5. The circuit breaker of claim 1 wherein the semiconductor switching element is capable of handling voltages exceeding about 20 kilovolts.

6. The circuit breaker of claim 1 wherein the semiconductor switching element is capable of blocking and passing current associated with a current density exceeding 300 amperes per square centimeter.

7. The circuit breaker of claim 1 wherein the semiconductor switching element is a transistor-based switching element.

8. The circuit breaker of claim 1 further comprising:
   a control system adapted to:
   upon occurrence of a fault condition in the load current:
      detect the fault condition;
      set the semiconductor switching element to a conducting state;
      upon setting the semiconductor switching element to the conducting state, set the first switch to an open position such that the load current substantially flows between the first terminal and the second terminal through the secondary path; and
      upon setting the first switch to the open position, set the second switch to the open position and the semiconductor switching element to the blocking state.

9. The circuit breaker of claim 8 wherein the control system, upon setting the first switch to the open position, sets the second switch to the open position prior to setting the semiconductor switching element to the blocking state.

10. The circuit breaker of claim 8 wherein the control system, upon setting the first switch to the open position, sets the second switch to the open position after setting the semiconductor switching element to the blocking state.

11. The circuit breaker of claim 8 wherein the semiconductor switching element is a gate turn-off (GTO) thyristor and when the load current is flowing through the secondary path after detecting the fault condition, the load current travels through the GTO thyristor from an anode to a cathode of the GTO thyristor.

12. The circuit breaker of claim 8 further comprising a bridge network that resides in the secondary path and comprises a first diode, a second diode, a third diode, a fourth diode, and the semiconductor switching element wherein:
   if the load current is flowing from the first terminal to the second terminal through the secondary path after detecting the fault condition, the load current will sequentially flow through the first diode, the semiconductor switching element, the fourth diode and the second switch; and
   if the load current is flowing from the second terminal to the first terminal through the secondary path after detecting the fault condition, the load current will sequentially flow through the second switch, the second diode, the semiconductor switching element, and the third diode.

13. The circuit breaker of claim 8 wherein the first switch and the second switch are electrically controlled mechanical switches.

14. The circuit breaker of claim 8 further comprising a resistor coupled in parallel with the semiconductor switching element.

15. The circuit breaker of claim 8 wherein the control system comprises current sense circuitry adapted to monitor and determine a magnitude of the load current flowing between the first terminal and the second terminal during the normal operation, and the control system is adapted to detect the fault condition when the magnitude of the load current flowing between the first terminal and the second terminal exceeds a defined threshold.

16. The circuit breaker of claim 8 wherein after the load current has been interrupted and the fault condition has ceased, the control system is further adapted to:
   set the second switch to the closed position and the semiconductor switching element to the conducting state, such that the load current substantially flows between the first terminal and the second terminal through the secondary path;
   set the first switch to the closed position, such that the load current substantially flows between the first terminal and the second terminal through the primary path; and
   set the semiconductor switching element to the blocking state.

17. The circuit breaker of claim 16 wherein the control system, upon setting the second switch to the closed position and the semiconductor switching element to the conducting state after the load current has been interrupted and the fault condition has ceased, sets the second switch to the closed position prior to setting the semiconductor switching element to the blocking state.

18. The circuit breaker of claim 16 wherein the control system, upon setting the second switch to the closed position and the semiconductor switching element to the conducting state after the load current has been interrupted and the fault condition has ceased, sets the second switch to the closed position after setting the semiconductor switching element to the blocking state.

19. A method for operating a circuit breaker comprising:
during normal operation, maintaining a first switch and a second switch in a closed position and a semiconductor switching element in a blocking state such that load current substantially flows between a first terminal and a second terminal through a primary path wherein the primary path extends between the first terminal and the second terminal and through the first switch; and
upon occurrence of a fault condition in the load current:
detecting the fault condition;
setting the semiconductor switching element to a conducting state;
upon setting the semiconductor switching element to the conducting state, setting the first switch to an open position such that the load current substantially flows between the first terminal and the second terminal through a secondary path wherein the secondary path extends between the first terminal and the second terminal and through the second switch and the semiconductor switching element; and
upon setting the first switch to the open position, setting the second switch to the open position and the semiconductor switching element to the blocking state.

20. The method of claim 19 wherein setting the first switch to the open position comprises setting the second switch to the open position prior to setting the semiconductor switching element to the blocking state.

21. The method of claim 19 wherein setting the first switch to the open position comprises setting the second switch to the open position after setting the semiconductor switching element to the blocking state.

22. The method of claim 21 wherein the semiconductor switching element is formed from a silicon carbide material system.

23. The method of claim 22 wherein the semiconductor switching element is a transistor-based switching element.

24. The method of claim 19 wherein the semiconductor switching element is a gate turn-off (GTO) thyristor, and when the load current is flowing through the secondary path after detecting the fault condition, the load current travels through the GTO thyristor from an anode to a cathode of the GTO thyristor.

25. The method of claim 24 wherein an epitaxial structure of the GTO thyristor is formed from a silicon carbide material system.

26. The method of claim 25 wherein the GTO thyristor is capable of handling voltages exceeding about 10 kilovolts.

27. The method of claim 26 wherein the GTO thyristor is capable of handling voltages exceeding about 20 kilovolts.

28. The method of claim 25 wherein the GTO thyristor is capable of blocking and passing current having a current density exceeding 300 amperes per square centimeter.

29. The method of claim 19 wherein after the load current has been interrupted and the fault condition has ceased, further comprising:

setting the second switch to the closed position and the semiconductor switching element to the conducting state, such that the load current substantially flows between the first terminal and the second terminal through the secondary path;
setting the first switch to the closed position, such that the load current substantially flows between the first terminal and the second terminal through the primary path; and
setting the semiconductor switching element to the blocking state.

30. The method of claim 29 further comprising, upon setting the second switch to the closed position and the semiconductor switching element to the conducting state, setting the second switch to the closed position prior to setting the semiconductor switching element to the blocking state.

31. The circuit breaker of claim 29 further comprising, upon setting the second switch to the closed position and the semiconductor switching element to the conducting state, setting the second switch to the closed position after setting the semiconductor switching element to the blocking state.

32. A circuit breaker comprising:
a first terminal and a second terminal;
a first switch and a second switch;
a silicon carbide gate turn-off (GTO) thyristor;
a primary path extending between the first terminal and the second terminal and through the first switch; and
a secondary path extending between the first terminal and the second terminal and through the second switch and the semiconductor switching element, wherein the GTO thyristor is capable of handling voltages exceeding about 10 kilovolts and capable of blocking and passing current associated with a current density exceeding 300 amperes per square centimeter such that during normal operation, the first switch and the second switch are maintained in a closed position and the semiconductor switching element is maintained in a blocking state such that load current substantially flows between the first terminal and the second terminal through the primary path.

33. The circuit breaker of claim 32 wherein the GTO thyristor is capable of handling voltages exceeding about 20 kilovolts.

34. A circuit breaker comprising:
a first terminal and a second terminal;
a first switch and a second switch;
a semiconductor switching element;
a primary path extending between the first terminal and the second terminal and through the first switch; and
a secondary path extending between the first terminal and the second terminal and through the second switch and the semiconductor switching element, wherein the semiconductor switching element is capable of handling at least one of voltages exceeding about 10 kilovolts and currents associated with a current density exceeding 300 amperes per square centimeter such that during normal operation, the first switch and the second switch are maintained in a closed position and the semiconductor switching element is maintained in a blocking state such that load current substantially flows between the first terminal and the second terminal through the primary path.

35. The circuit breaker of claim 34 wherein the semiconductor switching element is capable of handling voltages exceeding about 20 kilovolts.

* * * * *